United States Patent
Chen et al.

(10) Patent No.: US 10,402,488 B2
(45) Date of Patent: Sep. 3, 2019

(54) AUTOMATIC SPOKEN DIALOGUE SCRIPT DISCOVERY

(71) Applicant: Semantic Machines, Inc., Newton, MA (US)

(72) Inventors: Pengyu Chen, Cupertino, CA (US); Jordan Rian Cohen, Kure Beach, NC (US); Laurence Steven Gillick, Newton, MA (US); David Leo Wright Hall, Berkeley, CA (US); Daniel Klein, Orinda, CA (US); Adam David Pauls, Berkeley, CA (US); Daniel Lawrence Roth, Newton, MA (US); Jesse Daniel Eskes Rusak, Somerville, MA (US)

(73) Assignee: Semantic Machines, Inc., Newton, MA (US)

(*) Notice: Subject to any disclaimer, the term of this patent is extended or adjusted under 35 U.S.C. 154(b) by 188 days.

(21) Appl. No.: 15/358,666

(22) Filed: Nov. 22, 2016

(65) Prior Publication Data
US 2017/0147554 A1  May 25, 2017

Related U.S. Application Data

(60) Provisional application No. 62/259,849, filed on Nov. 25, 2015.

(51) Int. Cl.
| | | |
|---|---|---|
| *G06F 17/24* | (2006.01) | |
| *G06F 3/0482* | (2013.01) | |
| *G06F 3/16* | (2006.01) | |
| *G06F 17/22* | (2006.01) | |
| *G06F 17/27* | (2006.01) | |
| *H04L 29/08* | (2006.01) | |
| *G10L 15/22* | (2006.01) | |

(52) U.S. Cl.
CPC .......... *G06F 17/248* (2013.01); *G06F 3/0482* (2013.01); *G06F 3/167* (2013.01); *G06F 17/2247* (2013.01); *G06F 17/279* (2013.01); *G10L 15/22* (2013.01); *H04L 67/02* (2013.01)

(58) Field of Classification Search
CPC ...................................................... G06F 17/22
USPC ....................................................... 715/705
See application file for complete search history.

(56) References Cited

U.S. PATENT DOCUMENTS

| 9,761,225 B2 * | 9/2017 | Gandrabur .......... G10L 15/1815 |
|---|---|---|
| 2009/0119586 A1 * | 5/2009 | Weng ........................ G06F 8/30 |
| | | 715/705 |

* cited by examiner

*Primary Examiner* — Cao H Nguyen
(74) *Attorney, Agent, or Firm* — Alleman Hall Creasman & Tuttle LLP

(57) ABSTRACT

A method for configuring an automated dialog system uses traces of interactions via a graphical user interface (GUI) for an application. Each trace includes interactions in the context of a plurality of presentations of the GUI. Elements of one or more presentations of the GUI are identified, and templates are associated with portions of the trace. Each template has one or more defined inputs and a defined output. For each template of the plurality of templates, the portions of the traces are processed to automatically configure the template by specifying a procedure for providing values of inputs to the template via the GUI and obtaining a value of an output. The automated dialog system is configured with the configured templates, thereby avoiding manual configuration of the dialog system.

20 Claims, 5 Drawing Sheets

ACME AIRLINES

| DATE | DEPART | ARRIVE | FROM | TO | PRICE |
|------|--------|--------|------|----|----|
|      |        |        |      |    |       |
|      |        |        |      |    |       |
|      |        |        |      |    |       |
|      |        |        |      |    |       |
|      |        |        |      |    |       |
|      |        |        |      |    |       |

FIG. 3

AUTOMATIC SPOKEN DIALOGUE SCRIPT DISCOVERY

CROSS-REFERENCE TO RELATED APPLICATIONS

This application claims the benefit of U.S. Provisional Application No. 62/259,849 filed Nov. 25, 2015, the contents of which are incorporated herein by reference.

BACKGROUND

This invention relates to automatic spoken dialogue script discovery, and more particularly to automatic configuration of a spoken dialog system for script-based access to applications.

The World-Wide Web (the "web") includes various types of resources intended to be accessed by human users, including documents that directed incorporate content, as well as interfaces to computer-implemented systems that provide content in response to information provided through the interfaces.

Computer-oriented interfaces to computer-implemented systems are also accessible over the Web, for example, using "Web Services" interfaces, which may provide a way to exchange data using formats such as XML and JSON. To use a web service, an author of a "client" system generally uses documentation for the web service to write a program that accesses information via the web service. Structure of requests and responses to a web service may be specified (e.g., as XML schema) permitting some automation of authoring of clients.

In practice, most computer-implemented systems that are accessible over the Web provide human-oriented interfaces and very few provide computer-oriented (e.g., web service) interfaces. Therefore, there is a need to be able to automatically use human-oriented interfaces without requiring extensive programming for each interface.

Increasingly, users' desire to access computer-implemented systems without using conventional GUI-based interfaces. For example, today's voice-based personal assistants (e.g., Apple's Siri) attempt to provide information using a voice-based dialogue rather than using a GUI.

The content of the Web has been automatically indexed since the early 1990's using automated "web robots" that "crawl" accessible content. Generally, such web crawlers, start with a web site, and then expand their indexing search by following the hyperlinks on each site to other sites, and continuing the search in sensible ways. A substantial improvement over these web searching browsers was introduced by Google, which ranked each page by a function of the number of other pages which pointed to it.

"Crawling" of the web by search engines provides a way of automatically accessing content incorporated on web pages, for example, in response to keyword-based queries. However, such approaches are generally focused on the explicit content on web pages, and not on the content accessible via interfaces presented on the web.

Later efforts attempted to extract information from web pages by parsing the HTLM or the DOM (Document Object Module) information. Since the DOM information is relatively static, these techniques allowed re-sampling of news, weather, and other information pages. However, even these advanced techniques do not allow the user to take advantage of web sites where information is supplied to the site, and data, maps, pictures, or audio is returned. Early attempts at creating a "semantic web," where the restrictions which allow the automatic use of a web site are annotated and cataloged, have mostly failed. For instance, the W3C refers to "Semantic Web" as a vision of the Web of linked data. Semantic Web technologies enable people to create data stores on the Web, build vocabularies, and write rules for handling data. However, this technology has not been widely adopted.

Robotic interaction with web-based interfaces (e.g., be they human-oriented or web services based) can be scripted based on human programming (sometimes referred to as "screen scraping"). For example, a programmer mimics the actions of a user to retrieve information in a computer-implemented system.

One of the challenges in the construction of a general purpose dialogue system is adding additional functionality covering new services or new interactions. For example, one might want to enable users to book tickets on a new airline, order food from a local restaurant, buy movie tickets, or use a new social networking service. Traditionally, programmers would create or use the APIs necessary for interacting with each additional service, costing many man-hours. Moreover, if one wants to integrate these new components into the rest of a dialogue system (by, for example, using the same representation for contact information or flight itineraries) even more care must be taken to ensure all of the components fit together.

In many ways, however, this is duplicated effort: the HTML-powered display Internet as we know it contains most of the components needed for interacting with a broad array of online services and information. Indeed, many if not most online services are built expressly with the display Internet in mind. However, the focus on display-first services means that much of the information available on the Internet is less accessible or even inaccessible to machines or to audio-only interfaces. This is not to say that efforts have not been made to make the web more accessible (to both people and machines). Standards like ARIA enable users with disabilities—including visual impairment—to navigate websites more easily, by for instance using screen readers. Semantic Web standards likewise are an attempt at making machine-interpretation of websites easier.

These standards are not uniformly or (especially in the case of Semantic Web) widely employed. Even when accessibility standards are employed, they do not make for an experience that is as easy to use than those with the default visual display interface. In other words, screen readers are just as their name implies: they read the screen, leaving information integration to the user. It is not the coherent interactive experience that a person might have if they were to interact with another person who for whatever reason cannot see the website in question (for example, because they are visually impaired, driving, or simply not at a computer).

Voice-based interfaces to computer-implemented systems generally require programming of a "connector" between human-computer dialogue component and the interface to the computer-implemented system. For example, experimental Travel Reservation systems have implemented voice-based dialogs and programmed interactions with travel reservation systems (e.g., Sabre).

SUMMARY

One aspect, in general, automated discovery of an interface to content, permits automated retrieval of content accessible via the interface.

In some examples, this discovery may involve analysis of content on the interface (e.g., labels and prompts meant for presentation to a human user) as well as automated "probing" of the interface to determine what combinations of inputs provide fully-formed inputs that retrieve content from the computer-implemented system. The discovered interface rules will be cached in a data structure for future use by either a person, or by a proxy for a person.

Another aspect includes "crawling" of a set of computer-accessible interfaces (e.g., URLs on the Internet-accessible Web), and using the automated discovery of the interface to provide a system for automatically accessing content from web searchable content. This crawling and analysis may be learned through a training program looking at human/web interactions, or it may be discovered by an automated system which probes the web sites to discover the constraints for each information element requested by the site, and further the discovery of whether each element is required or optional.

Another aspect includes simulating a human-computer interaction to elicit information that is needed to access content via an interface, for example, an interface whose characteristics have been automatically discovered. This information is then provided via the interface in an automated system, and content retrieved via the interface is provided to a user. For example, the eliciting of information and the presentation of retrieved information are controlled in a single human-computer dialogue (e.g., by voice and/or text).

Another aspect includes interacting with web sites by using a text-based information interchange, and learning from those queries which type of information is required by the web site, and which is optional. A description of the requirements for text-based use of the web site is saved for future use.

Another aspect includes conducting (or specifying instructions in a machine-readable form for conducting) a human-computer dialogue in which the human user seeks information, and based on the dialog, one of multiple computer-implemented systems is selected for retrieval of content to satisfy the user's need.

Human-oriented computer-implemented interfaces generally do not have associated "instructions" in a form that would permit computer-implemented access to content that is available via the interface. Aspects that are generally not explicit include without limitation:
  General subject matter of the system that is accessible via the interface (e.g., weather forecasts, airline schedules, etc.)
  Sematic information associated with elements in the interface (e.g., associating a form field with user name, etc.)
  Overall constraints on a set of elements in the interface to define a valid query (e.g., is a city and state required for a weather forecast)

A technical problem is the automated analysis of a computer-implemented interface in order to determine aspects that are needed or useful for automated (e.g., robotic) access to content via the interface.

Another technical problem that is solved is using the information characterizing an interface (discovered automatically from a human-oriented interface, or otherwise such as using data schemas etc.), and controlling a human-computer dialogue to elicit information for input via the interface without requiring specific programming for that interface.

In another aspect, in general, a method for configuring an automated dialogue system begins with collecting a plurality of traces of interactions via a graphical user interface (GUI) server of an application. Each trace includes interactions in the context of a plurality of presentations of the GUI. Elements of one or more presentations of the GUI are identified. Templates are associated with portions of the trace. Each template has one or more defined inputs and a defined output. For each template of the plurality of templates, the portions of the traces are processed to configure the template by specifying a procedure for providing values of inputs to the template via the GUI and obtaining a value of an output. The automated dialogue system is configured with the configured templates.

One or more of the following features may be included.

The method further includes processing a user input using the configured automated dialogue system. This processing includes receiving linguistic input from a user, interpreting the linguistic input according to the plurality of templates, and interacting with the application according to the configured templates. The linguistic input may include a speech-based input and/or a text-based input.

The graphical user interface comprises a web-based interface accessible to the system over a data network, and the presentations of the GUI comprise web pages of the web-based interface.

Associating templates with portions of the traces includes extracting interactive elements of the web pages, and assigning one or more templates to each of the interactive elements.

Collecting the traces comprises monitoring interactions between users and the application. For instance, the interactions between the users and the application are via a GUI client, or are with a simulation of an automated dialogue system. The simulation of the automated dialogue system may use a text-based user input and/or a speech-based user input.

Collecting the traces further comprises automatically generating inputs to the application and when the inputs form a trace that successfully elicits an output, collecting that trace.

Collecting the traces comprises automatically generating inputs to the application and when the inputs form a trace that successfully elicits an output, collecting that trace The application comprises a web-based interface accessible to the system over a data network. The method further comprises automatically locating a plurality of web-based interfaces of applications, and for each interface, configuring one or more templates with a corresponding procedure for providing values of inputs to the template via the web-based interface and retrieving an output of the template via said interface.

Other features and advantages of the invention are apparent from the following description, and from the claims.

DESCRIPTION OF DRAWINGS

FIG. 3 is a schematic of a presentation of a result of submission of the form of FIG. 2.

DESCRIPTION

Figure 1:
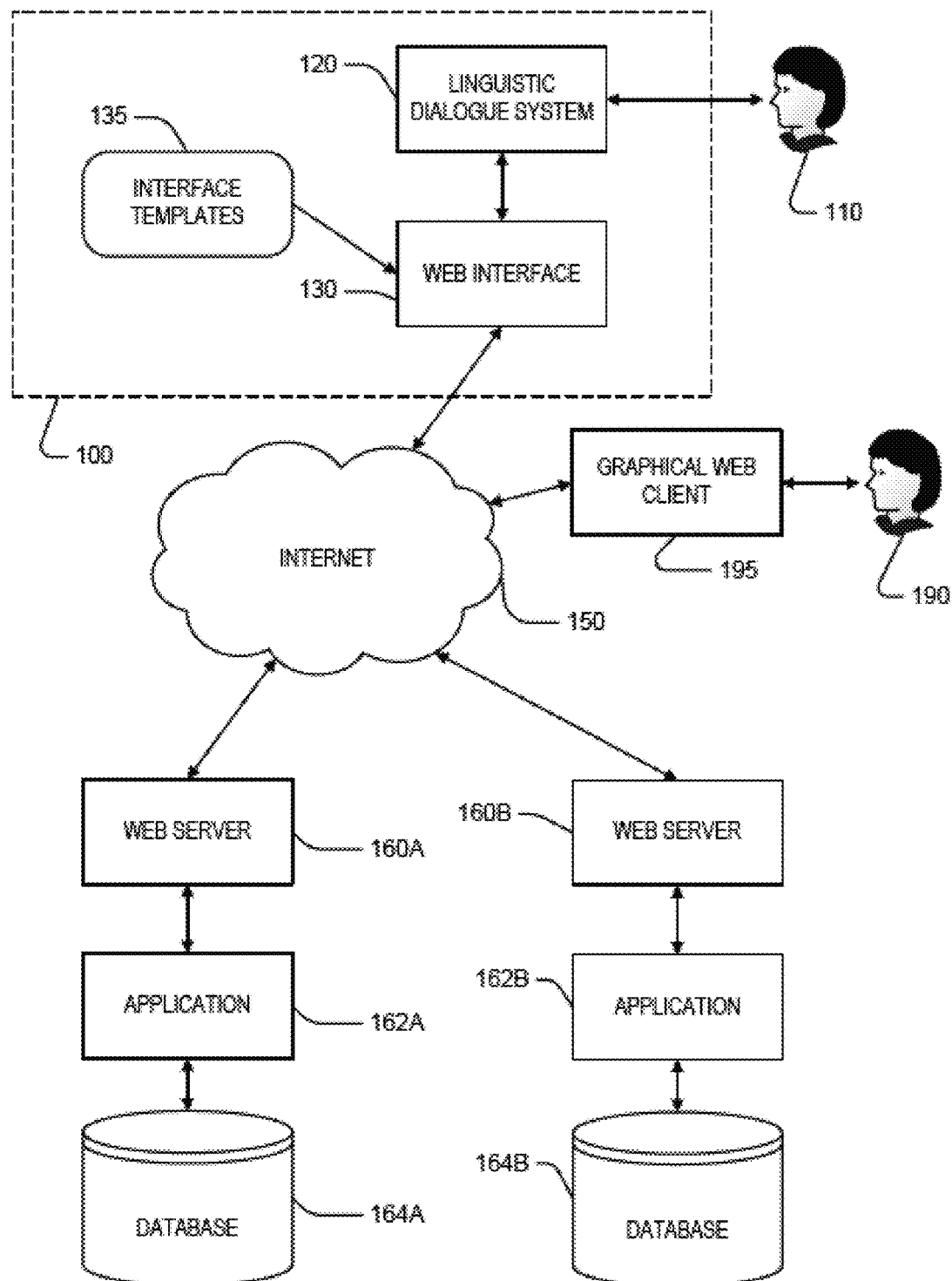
FIG. 1 is a block diagram of a dialogue system using a scripted Web interface.

Referring to FIG. 1, a system 100 provides a way for a user 110 to conduct a linguistic dialogue with the system, and to interact with representative applications 162A-B in order pass information between the system and the applications, for example, for the purpose of information retrieval and/or submission. In FIG. 1, the application 162A has or provides access to information in a database 164A, and presents an interface via a Web server 160A. For example, the Web server 160A responds to conventional requests from a graphical Web client 195 (e.g., Microsoft Internet Explorer) over the Internet 150. A user 190 interacts with the graphical Web client, for example, using a mouse and a screen display.

Using the system 100, another user 110 interacts with a linguistic dialogue system 120 providing linguistic inputs, for example, in the form of spoken utterances or typed sentences, and the system responds, for example, in linguistic form (e.g., as synthesized speech or display of text) or in other form of output (e.g., screen presentation of data, images, etc.). The linguistic dialogue system 120 at times determines that as part of the dialog, it needs to interact with a remote application (e.g., application 162A or 162B), and uses the scripted web interface modules 130 to perform that interaction. The web interface module uses interface templates 135 to control how the interaction with the web server 160A or 160B in order to provide information and/or retrieve information from the application.

In at least some embodiments, the linguistic dialogue system 120 has a structure that is described in detail in co-pending application, PCT/US2016/061303, titled "INTERACTION ASSISTANT," filed on Nov. 10, 2016, and incorporated herein by reference. The underlying dialogue system is assumed to model task-oriented dialogues using a representation similar to the following. The system has a collection of small "miniscripts" that it uses to complete portions of a dialogue task. These miniscripts are referred to as card templates (or templates for short). Cards are small "building blocks" out of which whole dialogues are constructed. For instance, the following might be cards in a dialogue system configured for sending email: finding a particular person's contact information in a database, given their name might be a card; reading a particular email; finding an email by query; sending an email draft; composing an email draft. Card templates may be constructed by programmers, or learned automatically, or a mixture of the two. Approaches described below relate to automatically creating card templates for use by the system for the purpose of accessing remote web-based applications.

Each card (i.e., an instance of a card template in a particular user dialogue) produces a result of some pre-specified type, which might represent an email message, a contact, or a certificate of completing some non-result bearing task, like reading an email. (A type is the dialogue system's equivalent to a database's schema. The type system used in the preferred embodiment is formally the same as the ML programming language's type system.) In addition, each card takes a number (possibly zero) of arguments (also called inputs), where an argument is specified by a type and some identifier to distinguish it from other arguments, which we call a name. Cards then have a procedure for producing an object of the result type by some combination of calling system-external APIs and interacting with a user.

These cards are arranged together in either or a chain or a nested structure by the dialogue system's planning module, so that the result of one card is used as one of the arguments to another. The structure of cards, created by this planning module is either called a "plan" or a "dialogue script." These plans may be constructed in response to a user's request or other events. The plan may define a partial order or a total order over what cards the dialogue system executes first.

The system generally has at least one interface template for each type of data that can be retrieved. In one approach, the templates for an application include the schema that are presumed to be used in the generation of the web interface provided by the web server for the application. A schema includes a definition of a type including the possible fields within that type. One common type of template relates to a form that is intended to be filled by a user in a graphical interface, specifying the structures in the web page associated with filing the form, and the nature of the information that is returned. The template includes information related to the functionality of the form in the sense that the information to be provided to difference slots in the form is specified in the template, as is the information that results from submission of the form. The scripted web interface 130 uses a template to retrieve the information. In some examples, the web interface uses a scripting tool such as Selenium Webdriver.

Figure 2:
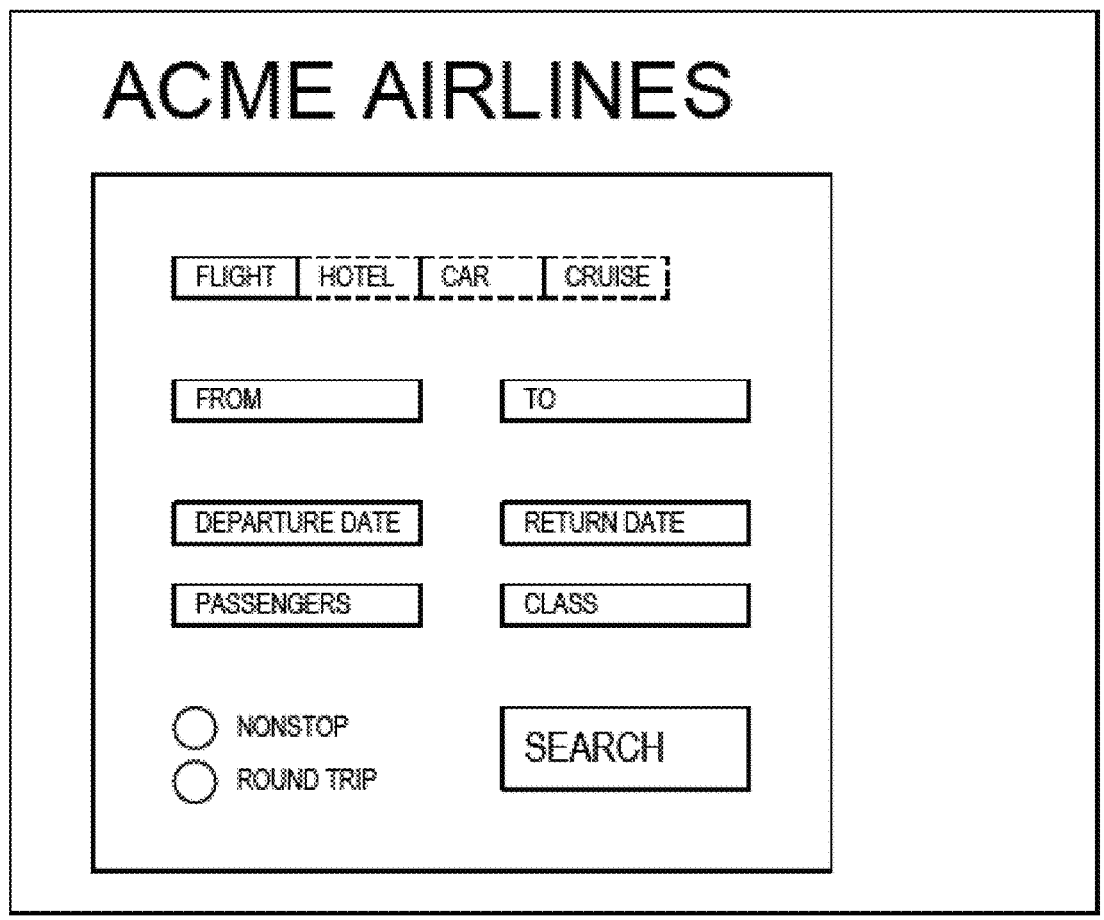
FIG. 2 is a schematic of a presentation of a form in a Web-based graphical user interface.

As an example, referring to FIG. 2, and example of a web form for an airline, where the user can select "FLIGHT" (rather "HOTEL" etc.), and enter "FROM" and "TO" locations, and other characteristics of a desired flight, and then select "SEARCH" causing the airline application to access its database and determine what flights match the requested criteria. Referring to FIG. 3, and example of a resulting screen presents the flight information in a tabular form. In the example of FIGS. 2-3, a template specifies the fields to be filled and the structure of the form of FIG. 2 into which the field values are to be filled, and specifies the structures of the resulting screen of FIG. 3 in which the retrieved information may be found.

One way to develop a library of templates suitable for retrieving data in this manner is to manually author the scripts required to automate the retrieval, with each manually authored script being associated with (e.g., stored in association with or within) a template. Although such manual authoring can be effective, and possibly necessary for complex web sites, there are advantages for such scripts to be determined in automated or semi-automated ways. A primary advantage is the reduced human effort that is required to form such scripts, which may in turn make it possible to have access to a much larger number of applications from the dialogue system.

Figure 4:
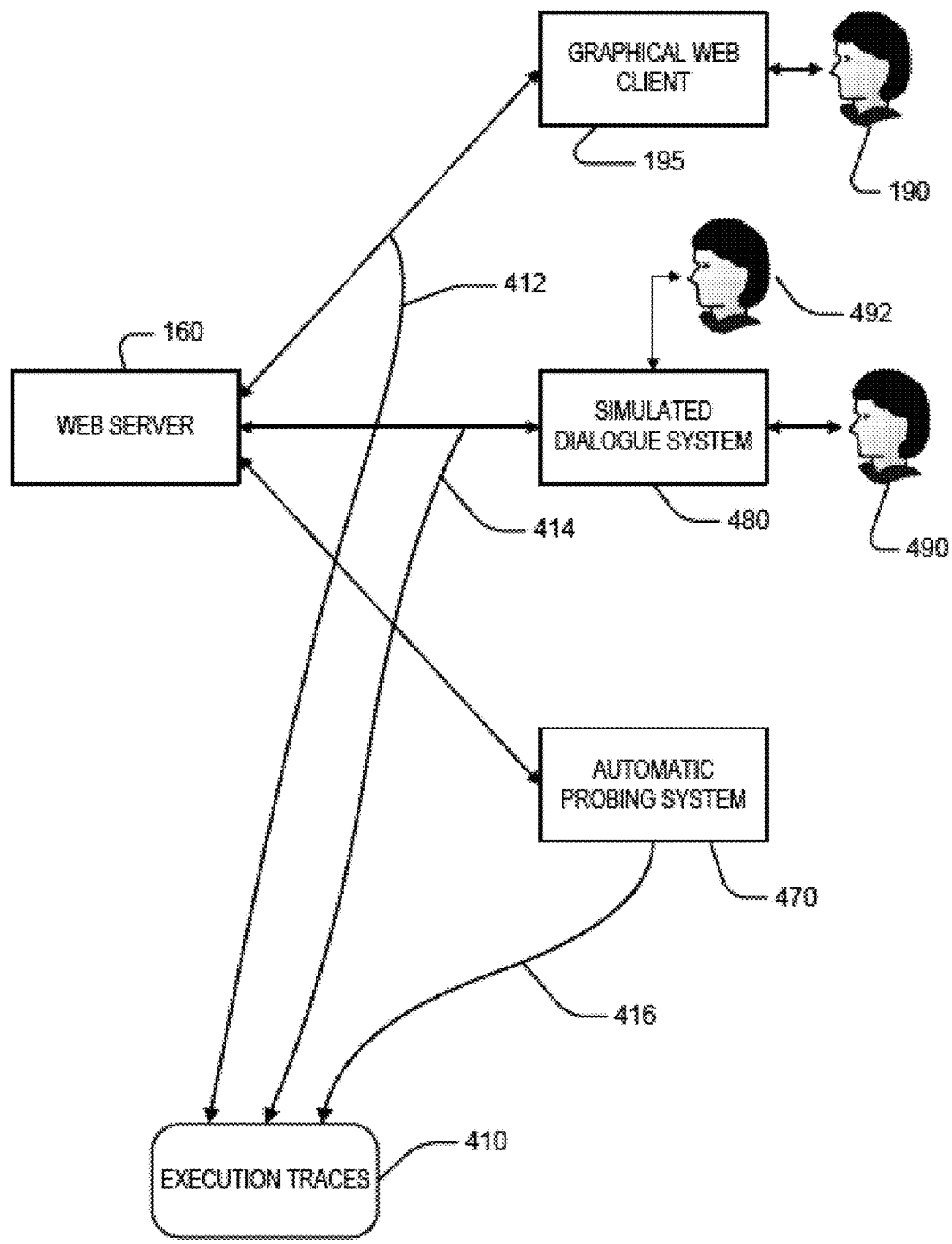
FIGS. 4-5 are diagrams illustrating an automated template configuration approach.

Rather than using a purely manual approach to authoring the scripts used to automate retrieval and/or submission of information, a number of approaches described below use automated techniques. Referring to FIG. 4, a first technique makes use of recorded exchanges with a web server 160 of web-based application involving a user 190 of a graphical interface 195 or a user 490 of a simulated dialogue system 480, and automated or semi-automated inference of the scripts based on the recorded exchanges. A second technique, which may be used in conjunction with the first technique makes use of a "crawling" of accessible web-based application and use of an automatic probing system 470 to discovery characteristics of the web-based applications, for example, that provide similar information as already known applications.

Continuing to refer to FIG. 4, in the first technique, a system monitors and records sequences of interactions (referred to herein as "execution traces") 412, 414 with a web server 160 (e.g., web server 160A of FIG. 1) from one or more web clients (e.g., graphical web client 195, or a simulated dialogue system 480), and infers the possible templates that may be installed in the template library based on an analysis of the traces. Each trace represents a single session between one user and the web server. More specifically, the system collects execution traces, where each trace includes a sequence of web pages and the actions taken on a web page by the system, such as filling in a text box with a particular value or clicking a link or button.

Figure 5:
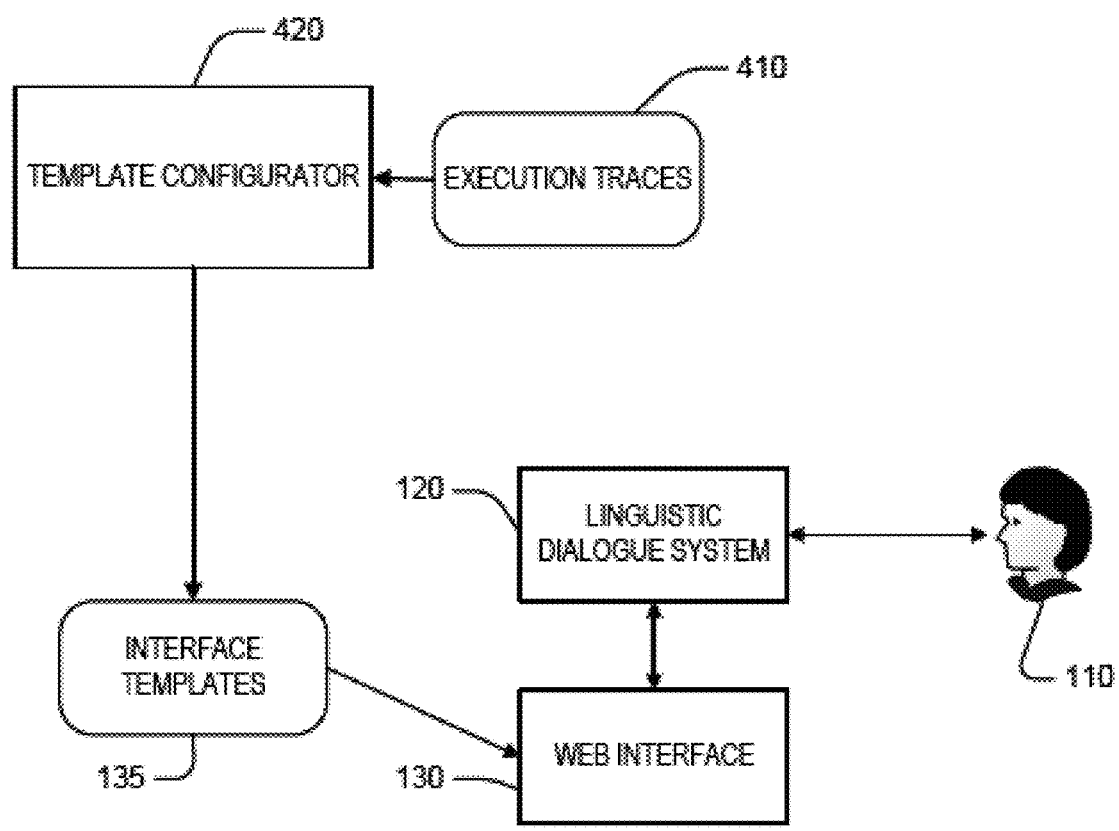

Referring to FIG. 5, for each execution trace of the collected execution traces 410, and a set of predefined templates each having a defined output and set of inputs, a template configurator 420 of the system aligns the execution trace with a sequence of instances of the templates. The general framework is to build a machine learning model that assigns zero or more cards to each "regular structure" in each trace, and cards take some number of inputs (with schemas as their types) as input and "produce" an object of another schema type.

For example, when the system locates an interactive HTML forms (indicated with the HTML <form> tag) or document structure (identified through wrapper induction, see. e.g., Kushmerick, Nicholas, "Wrapper induction: Efficiency and expressiveness." in *Proc. Fifteenth International Joint Conference on Artificial Intelligence*, Nagoya, Japan, Aug. 23-29, 1997; hand-specified patterns; or some other means) that probably indicates a semantic element in a web page, it continues with a further analysis of that web page. Such parts of a web page are referred to as "regular structures." More precisely, a regular structure is the subpart of a webpage that the system can interpret, in this case either an HTML form or the HTML node (or nodes) associated with an extracted item identified by wrapper induction. Each regular structure can include addition elements which are HTML <input> elements and the semantic fields identified by the wrapper induction system.

As an example, consider booking a flight on an airline's website. The typical process is to:
1. Enter the dates for departure and return, the location of departure and arrival, the number of passengers, and the "class" of ticket: economy, first-class, etc.
2. Select an itinerary from a list of options.
3. Selects additional options like travel insurance, etc.
4. (There may be several pages of other options.)
5. The user is asked to enter traveler and payment information and purchase the tickets for the flight.

Each of these steps corresponds to zero or more templates. The system's job is to infer which templates correspond to each step. In the preferred embodiment, each regular structure of a web page corresponds to exactly one template, and the template for each page in the sequence is necessary for producing at least one of the inputs for the template associated with the next page.

Continuing with the example, the process for booking a flight can be broken into several distinct templates. Working from the end first, the system creates a template representing the value "purchased flight on Acme Airlines". This template takes several inputs: contact information for the traveler(s), a user's payment information, and a special token type representing the completion of the previous set of regular structures. The templates for the previous pages are derived analogously: there are some number of input types described on the page which are used as inputs in addition to the token for the pages that precede it.

The system could create templates following this basic procedure in a variety of ways. In a preferred embodiment, each template is based on a group template that is used to group related templates from different web sites (for instance, selecting a flight on one website versus another). A group template defines a name, a list of arguments, and an output type. In the current example, "select-flight-itinerary" and "search-flights" might be templates. A template for a particular web site that is determined from a group template using a website generally has a subset of the argument types, and the output type may be a subtype of the group template's type. The set of group templates may come from a database of known types, or it may be automatically induced from data, or a mixture of the two: with some group templates pre-populated by a known database and some inferred by hand. These group templates are useful for at least two reasons. First, they help the system interpret the regular structures in the web pages that are found. Second, they allow the dialogue system to cluster related templates, so that behavior learned for one card can be "translated" (or otherwise mapped) to another. In the preferred embodiment, the dialogue system does this by adding machine learning features (just an indicator feature) for each induced template indicating which group template it comes from.

In the preferred embodiment, the regular structures of the web pages represented in an execution trace are aligned to templates using an unsupervised generative probabilistic model. The alignments produced by the generative model associate each element in the regular structure (either an HTML <input> element or a semantic field from wrapper induction) with one of the properties of the arguments to the chosen group template. For instance, the text box for "city" in a shipping form might be associated with the "city" property of the "addressee" contact argument in the group template. In the preferred embodiment, the generative model is as follows:

Generate a number of group templates
For each group template p:
    Generate a number of input argument types $t_{pa}$ with names $n_{pa}$
For each regular structure w in each trace:
    Choose a group template $p_w$.
    Choose a number of elements $E_w$ (where The elements in a regular structure are the elements in an HTML form in the case of regular structures, and the fields identified by the wrapper induction system otherwise)
    For each element $e_w \leq E_w$:
        Choose an input argument $a_e$ from the group template with $p_c$ type $t_a$, conditioned on the previously emitted elements.
        Choose a property of that argument $p_e$
        Emit an element for that type conditioned on the type of that property and the input argument. For <input> elements, the value entered into the form is generated as well.

In the preferred embodiment, the distributions for the variables of the model can be configured, but by default they are parameterized as follows:
Types are generated according to a recursive process.
    There is a set of "primitive" types that are prepopulated in the system's type database. These include strings, numbers, locations, email addresses, dates, etc.
    There is also a set of "basic" types for things like contact information and payment detail. These are record types, described in the next bullet.
    There is a "list" type, which has a number N of elements, each of the same type (chosen recursively by the type generator)
    There are "record" types, consisting of a number of fields F (chosen geometrically or through another distribution) each with a name and a type. The types of the fields are chosen by recursively invoking the generator.

To generate a type, the system chooses either to create a primitive type, a new record type, or a list type.

The distribution can be memorized using an adaptor grammar or similar mathematical object to encourage structure reuse.

The set of "properties" of a type are the leaves of the tree induced from the type's structure, with basic types like contacts having properties.

In the event that the system is configured to use only a predefined set of group templates, the set of types is fixed as the set of types in the group templates, and the recursive process is not used.

The choice of input argument $a_e$ can be a discrete time Markov model over input arguments, with a distribution that, with some probability sticks with the same argument, and otherwise it chooses another argument uniformly at random. This causes the model to prefer to generate the information for one argument in a row, rather than randomly jumping from argument to argument.

Other distributions not explicitly mentioned are taken to be multinomial distributions over their respective output spaces, except for counts, which are given by a geometric distribution.

Other distributions are of course possible for any of the components.

Using this generative model, the alignment between the regular structures and group templates can be inferred using any reasonable inference technique, including a Metropolis-Hastings-based MCMC sampler (used in the preferred embodiment). The variables $p_e$ define the alignment between the card's structure and the regular structure. This alignment is used when the system is deployed in order to fill in forms and extract object information for regular structures found by wrapper induction.

Once the alignment variables for each regular structure are found, the system produces an instance of the chosen template that includes all of the inputs used in the alignment variables, and the card produces its result by entering the appropriate information into the fields and clicking the link or submitting the form.

Once the templates for a web site have been extracted and the dialogue system has been trained to use them, the main remaining step is to actually fill out the web forms using the inputs provided to the card and to extract the information for arguments that is already provided on the page. As described above, this can be achieved by preserving the alignments between the properties in the template's inputs and with the elements in the web page. Then, using a program like Selenium, any form can be programmatically submitted with the appropriate data.

The system has a confidence measure of how sure it is of its extracted instance of a template for a particular site. In the preferred embodiment, this measure is simply the log likelihood computed by the generative model of seeing the regular structure given the induced cards. If this measure does not exceed a given threshold for a particular website, the website is not included in the system's augmented collection. They may either be discarded, or flagged for analysis by a human. This threshold may be set according to business need, and it may vary with the domain: one would demand higher confidence for interacting with a banking site than for finding out sports scores.

From time to time, a user may request visiting a site that the system has not seen before. In this case, the system may choose to try to convert the web page into a card on-demand. To do so, it runs a version of the template alignment algorithm on the web page to determine which types are expected and what kind of card is represented by the page. If a card is matched, the system uses that card. If not, it may report an error to the user, or it may escalate to a human agent, depending on the system's configuration.

In any case, the system illustrated in FIG. 1 is configured with a set of templates (i.e., interface templates 135), which can be invoked by the dialogue system 120 as part of its analysis of the linguistic interaction with a user 110. The inferred scripts and association of inputs to a card with structures of web pages (e.g., form slots) provide the mechanism for mapping inputs to the output of the template.

Referring again to FIG. 4, in the second technique, which involves "crawling" of accessible web-based application for discovery of new web-based applications. Essentially execution traces 416 for new web site may be based on an automated probing on the fillable portions of a form by an automatic probing system 470 to see what types of inputs elicit a response of the appropriate type.

For each website discovered by the crawler, the system extracts the set of regular structures in that page, for example, in the pages illustrated in FIGS. 2 and 3. Once regular structures are suitably identified, the system collects execution traces by manipulating interactive elements within the regular structures. Specifically, it attempts to fill out the forms using dummy data: radio boxes are checked, text fields are filled out with the appropriate types of data (e.g. dummy names, dummy dates), etc. The system submits this data using an automated website scripter, such as Selenium. It may also click on links inside the regular structure's HTML nodes. When the system receives a response page, it classifies that page as either an error, an additional page relevant to the same task that asks for more information, or the "end". This classification can be performed either using a supervised learning classifier (such as a support vector machine) or hand-written rules. In either case, the system uses features from the returned page including the HTTP status code and keywords (such as "error" or "success"). In the preferred embodiment, the system uses a support vector machine. In addition, the system can be configured to stop when it encounters a request for credit card or other payment information (such as PayPal, Google Wallet, etc.), interpreting such a page as a success.

The system repeatedly invokes the same form with different data to build a set of example sequences that complete the task. The system then records these traces, which amount to a sequence of regular structures (and the web pages that contain them) and the information entered into the forms.

This process may be undertaken randomly, or—in the preferred embodiment—using a reinforcement learning algorithm such as Q-learning or Deep-Q Learning. In reinforcement learning, the system takes an action from a set of possible actions at each step, and it receives a reward signal at periodic intervals. The actions in this setup are filling in the different form inputs and submitting the forms. The reward signal can either be positive or negative: whenever the system receives an error code or message from the server matching a pre-specified condition (e.g. the returned page contains the word "error"), it gets a negative reward. If, on the other hand, the form advances without error, it receives either a slight negative reward or a zero reward (to discourage the system from following infinite loops). If it reaches a successful completion page, it gets a large positive reward. These values may be configured.

Once successful traces are obtained by this automated process, the system uses them in essentially the same way as with traces collected during interactive use of the web based applications. That is, the traces are aligned to instances of card templates, and the card templates are configured to perform the web interactions that yield the mapping from inputs to the output of the cards.

In a somewhat related approach to that described above for automatic discovery of a way of interacting with a web site using a linguistic interface, the process may be somewhat "inverted" to provide a graphical interface to a voice-based human interface (e.g., via a telephone operator), or to provide a linguistic interface (e.g., text or voice input) that is mediated by the system to interact with a voice-based human interface. That is, the system may interface with the user as well as the "application" via different linguistic interfaces, and essentially translate or mediate the interactions. For example, today it may be difficult to book an appointment for a haircut, or order flowers from a local florist, using only "online" tools. Instead, these kinds of services are usually procured via telephone.

Indeed, the ability to schedule appointments and order services using a telephone is a fairly typical responsibility of a human assistant. A general-purpose dialogue system that aims to replicate many of the capabilities of a human assistant should therefore be able to make such arrangements on behalf of its users. Thus, the system can also call phone numbers extracted from online directories (like Yelp) and engage directly with merchants or other service-providers.

For instance, the user of a dialogue system might ask to book a teeth cleaning at a particular dentist's office. In response to the user's request, the system looks up the business's contact information in a database and—after possibly confirming the listing—chooses a card matching the user's request and the type of business. In this case, it might choose a "book-medical-appointment" card, which expects a medical office, an appointment type ("teeth cleaning"). The system would then call the dentist's office, and—using a text-to-speech system—optionally identify itself as an automated agent and then state the user's request using the system's language generation facility. At this point, the system is now acting as a dialogue agent for the merchant who received the phone call: it uses another card (e.g. "book-merchant-medical-appointment") to complete the interaction by talking to the merchant. In the case of booking an appointment, this might involve scheduling a free time on the user's calendar, using a predefined card for calendaring. Conceptually, this whole process may be thought of as instantiating a different dialogue session that connects to the merchant, and sends results back to the first dialogue session.

For each domain the system builders wish to support, developers create two cards: a "user" card and a "merchant" card. The "user" card specifies the inputs needed to initiate the request (the business's contact information, calendar constraints, the good or service desired, etc.). The user card then invokes the "merchant" card. The merchant card specifies a script for conveying the information in the request. As inputs, it takes the user's request (as compiled by the user card) and whatever information is necessary for the merchant to provide. As a result, it returns either a confirmation or a failure notification, which is then passed back to the user card. Requests for more information are communicated between the "user" and "merchant" cards as events similar to the "message sent" event the system receives for handling email. These events are interpreted as necessary by the card.

Data collection for the telephony-enabled system is similar to the data collection procedure for the web-based system. However, the execution traces collected for this task are only collected from human-conducted sessions, in which a human actually calls merchants. (Because we do not want our system making random calls to merchants or other people, we do not attempt an analog to the automatic-discovery procedure outlined for web forms.). For the purposes of training, each "half" of the execution trace is treated as a separate dialogue. Otherwise, the training is identical to the training outlined above for a "Wizard of Oz" approach.

When deployed, the dialogue system now has access to the additional cards learned during the training phase. If the user makes a request matching one of the card descriptions, the system activates the user card, gathers additional information related to the request (for instance, asking for available dates and time, or checking the user's calendar), locates an appropriate business (using a user's pre-registered preference, if available), possibly confirms the business information with the user, and then places a phone call to the business.

If the merchant answers, the system then deploys the merchant card in its interaction with the merchant. The system conveys the user's request to the merchant, and then follows the other steps of the card to complete the request. Once completed, the system notifies the user.

Because interacting with the real world is (of course) much more complex than interacting with structured web pages, the system has the ability to escalate the conversation in a number of different ways. If the dialogue system that is interacting with the merchant determines that the conversation is going poorly (using standard measures of user frustration), it may choose to either abort the interaction (by, for example, apologizing and hanging up), requesting more information from the user (for instance, by asking for additional times), transferring the call to a human agent, or transferring the call directly to the user. The choice is parameterized by the type of request and user's preferences, using a machine learning classifier. This escalation behavior is similar to the behavior that can be used by the dialogue system in interacting with the user, with the exception that it may escalate not only to a human agent but also to the user.

Some tasks may require delivery of goods. For instance, a local florist may not have its own delivery service. In locations where they are available, the system may also contact a local logistics or "micro-task" company, like a courier service or TaskRabbit. This may be completed either using an additional (possibly parallel) phone call, using a learned web service (as described earlier in this document), or a custom-written API for the purpose. In the preferred embodiment, it uses a mix of the three, depending on the market. (TaskRabbit, for instance, is not available in all locations.)

It should be understood that there are yet other ways of obtaining traces from which the card templates for the interactive applications may be obtained. For example, rather than collecting traces associated with a user 190 interacting via a graphical web client 195, a "Wizard of Oz" simulation of an automated spoken dialogue system 120 may be used in which a human operator makes decisions for which the system is not yet configured or which the operator observes the system making an incorrect decision.

It should also be understood that web-based applications are merely one example of an application that may be interfaced from an automated dialogue system in this way.

For example, there is no need for the applications to be accessible over a data network (e.g., the Internet) or to use any particular protocol or markup language (e.g., http and HTML)—essentially the same procedures for discovery of the card templates may be used for a wide class of applications.

Implementations of the system may use software that includes instructions (stored on non-transitory machine-readable media) that control one or more computers. For example, the functions illustrated in FIG. 1 may be executed on a single computer, or may be partitioned and executed on multiple computers that communicate, for example, over data networks. In some multiple-computer implementations, certain components may be hosted at a computer or other computing device at the user's location (e.g., a speech integration component) while other components may be hosted on server computers at one or more locations remote from the user. The functions of collecting traces and configuring the templates according to the collected traces as described above may be hosted on yet other computer.

It is to be understood that the foregoing description is intended to illustrate and not to limit the scope of the invention, which is defined by the scope of the appended claims. Other embodiments are within the scope of the following claims.

What is claimed is:

1. A method for configuring an automated dialogue system, comprising:
    observing runtime state data of a graphical user interface (GUI) during operation of the GUI;
    recording a plurality of traces of the runtime state data, wherein a trace identifies, in the runtime state data, inputs provided to the GUI and output values produced by the GUI;
    associating one or more natural language processing (NLP) templates with the plurality of traces; and
    for each of the one or more NLP templates and associated traces, configuring the automated dialogue system to:
        process a linguistic input utterance by a user to determine one or more input data values to provide to the GUI;
        provide the one or more input data values to the GUI;
        obtain an output value from the GUI; and
        output a linguistic output utterance indicating the output value.

2. The method of claim 1 further comprising processing, by the automated dialogue system, a natural language user input using the configured automated dialogue system, including receiving a linguistic input utterance from a user, interpreting the linguistic input utterance according to the plurality of templates, and providing input data values to the GUI based on interpreting the linguistic input utterance according to the plurality of templates.

3. The method of claim 2 wherein the linguistic input utterance comprises a speech-based input.

4. The method of claim 2 wherein the linguistic input utterance comprises a text-based input.

5. The method of claim 1 wherein the GUI comprises a web-based interface accessible to the system over a data network.

6. The method of claim 5 wherein associating NLP templates with the plurality of traces includes extracting interactive elements of one or more web pages presented by the web-based interface, and assigning one or more templates to each of the interactive elements.

7. The method of claim 1 wherein recording the plurality of traces comprises monitoring interactions between users and the GUI.

8. The method of claim 7 wherein the GUI is a GUI client program.

9. The method of claim 1 further comprising recording an additional plurality of traces by recording a simulation of an automated dialogue system.

10. The method of claim 9 wherein the simulation of the automated dialogue system uses a text-based user input.

11. The method of claim 9 wherein the simulation of the automated dialogue system uses a speech-based user input.

12. The method of claim 1, further comprising automatically generating inputs to the GUI and when the inputs form a trace that successfully elicits an output, recording that trace.

13. The method of claim 1 wherein the GUI comprises a web-based interface accessible to the automated dialogue system over a data network, and where the method further comprises automatically locating a plurality of web-based interfaces of applications, and for each interface, configuring one or more templates with a corresponding procedure for providing values of inputs to the template via the web-based interface and retrieving an output of the template via said interface.

14. A computer system comprising:
    a logic device; and
    a storage device holding instructions executable by the logic device to:
        observe runtime state data of a graphical user interface (GUI) during operation of the GUI;
        record a plurality of traces of the runtime state data, wherein a trace identifies, in the runtime state data, inputs provided to the GUI and output values produced by the GUI;
        associate one or more natural language processing (NLP) templates with the plurality of traces; and
        for each of the one or more NLP templates and associated traces, configure an automated dialogue system to:
            process a linguistic input utterance by a user to determine one or more input data values to provide to the GUI;
            provide the one or more input data values to the GUI;
            obtain an output value from the GUI; and
            output a linguistic output utterance indicating the output value.

15. The computer system of claim 14, wherein the linguistic input utterance comprises a speech-based input.

16. The computer system of claim 14, wherein the linguistic input utterance comprises a text-based input.

17. The computer system of claim 1, wherein associating one or more NLP templates with the plurality of traces includes:
    detecting, in a trace of the plurality of traces, one or more regular structures;
    for each regular structure detected in the trace:
        identifying one or more datatypes included in the regular structure;
        for each datatype included in the regular structure, selecting a field of an available NLP template, the field corresponding to the datatype.

18. The computer system of claim 17, wherein selecting the field of the available NLP includes operating a previously-trained discrete time Markov model.

19. The computer system of claim 17, wherein the GUI is defined by one or more hypertext markup language (HTML)

elements and wherein the one or more regular structures include an HTML input element.

20. A computer system, comprising:
an automated dialogue system;
a monitoring system configured to:
   observe runtime state data of a graphical user interface (GUI) during operation of the GUI, and
   record a plurality of traces of the runtime state data, wherein a trace identifies, in the runtime state data, inputs provided to the GUI and output values produced by the GUI; and
a template configurator configured to:
   associate one or more natural language processing (NLP) templates with the plurality of traces, and
   for each of the one or more NLP templates and associated traces, configure the automated dialogue system to:
      process a linguistic input utterance by a user to determine one or more input data values to provide to the GUI,
      provide the one or more input data values to the GUI,
      obtain an output value from the GUI, and
      output a linguistic output utterance indicating the output value.

* * * * *